United States Patent
Kumar et al.

(10) Patent No.: US 11,687,557 B2
(45) Date of Patent: Jun. 27, 2023

(54) DATA SIZE AND TIME BASED REPLICATION

(71) Applicant: EMC IP Holding Company LLC, Hopkinton, MA (US)

(72) Inventors: Shiv S. Kumar, Pune (IN); Jai P. Gahlot, Pune (IN)

(73) Assignee: EMC IP HOLDING COMPANY LLC, Hopkinton, MA (US)

( * ) Notice: Subject to any disclaimer, the term of this patent is extended or adjusted under 35 U.S.C. 154(b) by 0 days.

(21) Appl. No.: 17/062,911

(22) Filed: Oct. 5, 2020

(65) Prior Publication Data
US 2022/0107957 A1    Apr. 7, 2022

(51) Int. Cl.
*G06F 16/30* (2019.01)
*G06F 16/27* (2019.01)

(52) U.S. Cl.
CPC .................................... *G06F 16/27* (2019.01)

(58) Field of Classification Search
CPC ....................................................... G06F 16/27
See application file for complete search history.

(56) References Cited

U.S. PATENT DOCUMENTS

| | | | |
|---|---|---|---|
| 8,260,750 B1 * | 9/2012 | Gugick | G06F 11/1451 707/645 |
| 2016/0162369 A1 * | 6/2016 | Ahn | G06F 11/1451 707/654 |
| 2016/0371154 A1 * | 12/2016 | Makimoto | G06F 11/1461 |
| 2019/0163370 A1 * | 5/2019 | Sure | G06F 11/0793 |
| 2020/0042183 A1 * | 2/2020 | Meiri | G06F 3/065 |
| 2020/0042400 A1 * | 2/2020 | Ashokkumar | G06F 11/1469 |

* cited by examiner

*Primary Examiner* — Khanh B Pham
(74) *Attorney, Agent, or Firm* — Amin, Turocy & Watson, LLP

(57) ABSTRACT

Techniques are provided for data size and time based replication. In an example, a first daemon monitors data changes that corresponds to a first replication policy, and a second daemon monitors an amount of time since performing a replication for the first replication policy. Where either a data modification threshold is met, or a time threshold is met, the daemons can perform a replication, and reset both a data counter and a timer that determine when next to perform a replication.

20 Claims, 11 Drawing Sheets

DATA SIZE AND TIME BASED REPLICATION

TECHNICAL FIELD

The present application relates generally to backing up computer data across multiple computing devices.

BACKGROUND

Data replication can generally comprise copying, or replicating, data from one computing device to another computing device for the purpose of backup. For example, data can be replicated from a first computing cluster (which can be a set of computing devices that work together and can be logically considered to be a single computing system) to a second computing cluster. Then, if the first computing cluster fails, the second computing cluster can possess an updated state of the first computing cluster, and can take over services provided by the first computing cluster, such as data storage and access.

Storage systems can implement a replication facility to provide for data recovery in event of disaster. An example of a replication facility is a DELL ISILON SYNCIQ replication service. Some replication services implement a time based replication. In a time based replication, a recovery point objective (RPO) can be defined that refers to a tolerance for data loss, and is expressed as an amount of time (e.g., four hours, or one day). That is, a tolerance for data loss can be that up to four hours of the most recent data is lost.

A replication service can maintain a schedule such that the RPO is met. For instance, with a four-hour RPO, a replication can be scheduled to migrate data at least every four hours.

BRIEF DESCRIPTION OF THE DRAWINGS

Numerous aspects, embodiments, objects, and advantages of the present embodiments will be apparent upon consideration of the following detailed description, taken in conjunction with the accompanying drawings, in which like reference characters refer to like parts throughout, and in which.

DETAILED DESCRIPTION

Overview

Figure 1:
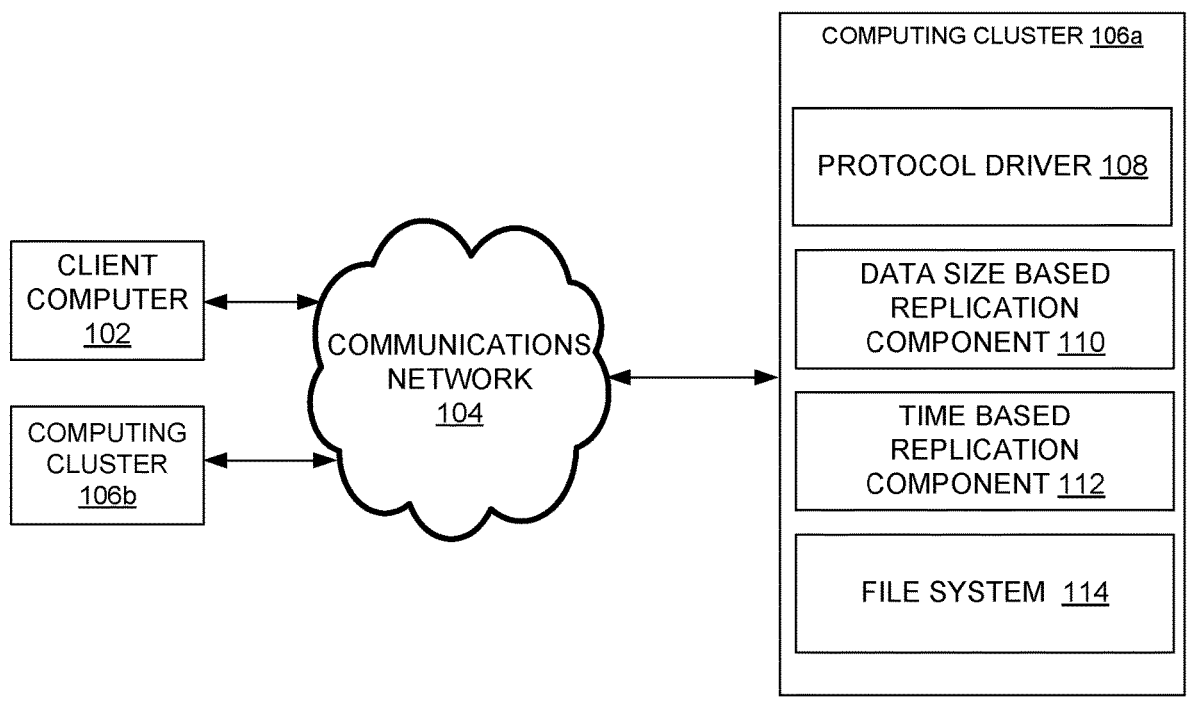
FIG. 1 illustrates an example system architecture that can facilitate data size and time based replication, in accordance with certain embodiments of this disclosure.

A problem with time based replication approaches is that the configured replication schedules can be static, because they start data migration for a replication on a specified time, and periodically. However, an amount of data that is changed between two replications can vary drastically, since the corresponding amount of I/O on the system can greatly vary. On some days, a given workflow can produce a larger amount of data than on other days. Since a time based replication policy starts only on a specified schedule time, it can expose a larger risk of losing data, where more data was modified during that time period.

A solution to this problem can be to combine multiple approaches to replication timing. A time based replication approach can be combined with a data size based replication approach so that an amount of data changed between replications is limited. In a data size based replication, a RDO can be defined that refers to a tolerance for data loss, and is expressed as an amount of bytes (e.g., 1 gigabyte (GB)).

A replication policy can define a RPO and/or a RDO. Where just a RPO is defined in a replication policy, a replication can be started as soon as a scheduled time approaches. For example, a replication can be started every day at 1:00 am. Where just a RDO is defined in a replication policy, a replication can be started as soon as the RDO threshold is reached. For example, a replication can be started as soon as 1 GB of data change has been registered for a set of files that are defined in a replication policy.

Where both a RPO and a RDO are defined in a replication policy, a replication can be started upon either a RPO or a RDO threshold being reached. For example, a replication can be started every day at 1:00 am, or whenever 1 GB of data change has been registered since the last replication—whichever comes first.

In some examples where replication is performed by a daemon (which can be a computer program that runs as a background process on a computer system), a RDO daemon can handle monitoring for a RDO trigger. Then, a RPO daemon can handle both monitoring for a RPO trigger, as well as starting a replication upon either the RDO trigger or the RPO trigger. That is, where the RDO daemon determines that the RDO trigger is met, the RDO daemon can send a start job notification to the RPO daemon to start a replication, and the RPO daemon will start the replication triggered by the RDO trigger.

It can be appreciated that this is an example, and there can be example architectures where the daemons have different roles—e.g., the RDO daemon handles starting a replication upon either the RDO trigger or the RPO trigger; the RDO daemon handles starting a replication upon a RDO trigger, and the RPO daemon handles starting a replication upon the RPO trigger; there are more or fewer than two daemons; or the present techniques are implemented without the use of daemons.

In some examples, data size based replication can be implemented as follows, such as by a RDO daemon. A RDO daemon can load a replication path and file filters for each of one or more replication policies. For each of these replication policies, the RDO daemon can create a counter, which can be used to track how much data has changed since a previous replication.

A RDO daemon can register with one or more protocol drivers that processes data changes to receive a notification about data changes. The RDO daemon can register a callback with each protocol driver to receive a notification about input/output details (such as a file path, an input/output type, and a number of bytes in the change), for close-modified, rename, and delete operations.

For each data change notification received by the RDO daemon, the RDO daemon determine the file path for the data change as specified in the notification. The RDO daemon can determine if the file path matches a replication path of any replication policies. If the file path does match a replication path for any file policies, then the RDO daemon can apply any file exclude/include filters for the matched replication policy on the file path. If the file path does not match a replication path for any file policies, or after applying any file exclude/include filters for the matched replication policy on the file path, the RDO daemon determines that the file path should not be replicated, then the RDO daemon can discard the information associated with the replication.

Where the RDO daemon determines that the file path should be replicated, then the RDO daemon can extract the matched replication policy name. The RDO daemon can increment the replication policy's counter by a number of bytes of the data change, as specified in the notification. If the RDO daemon determines that the value of the counter is now at least as large as a RDO defined for the replication policy, then the RDO daemon can send a start job notification to the RPO daemon, which can start a replication corresponding to the replication policy.

After a replication is successfully completed (either prompted by a RDO trigger or a RPO trigger), the counter for the corresponding replication policy can be reset, so that it measures an amount of data changed since the prior replication for that replication policy.

Example Architectures

FIG. 1 illustrates an example system architecture 100 that can facilitate data size and time based replication, in accordance with certain embodiments of this disclosure. As depicted, system architecture 100 comprises client computer 102, communications network 104, computing cluster 106a, and computing cluster 106b. In turn, computing cluster 106a comprises protocol driver 108, data size based replication component 110, time based replication component, and file system 114.

Figure 11:
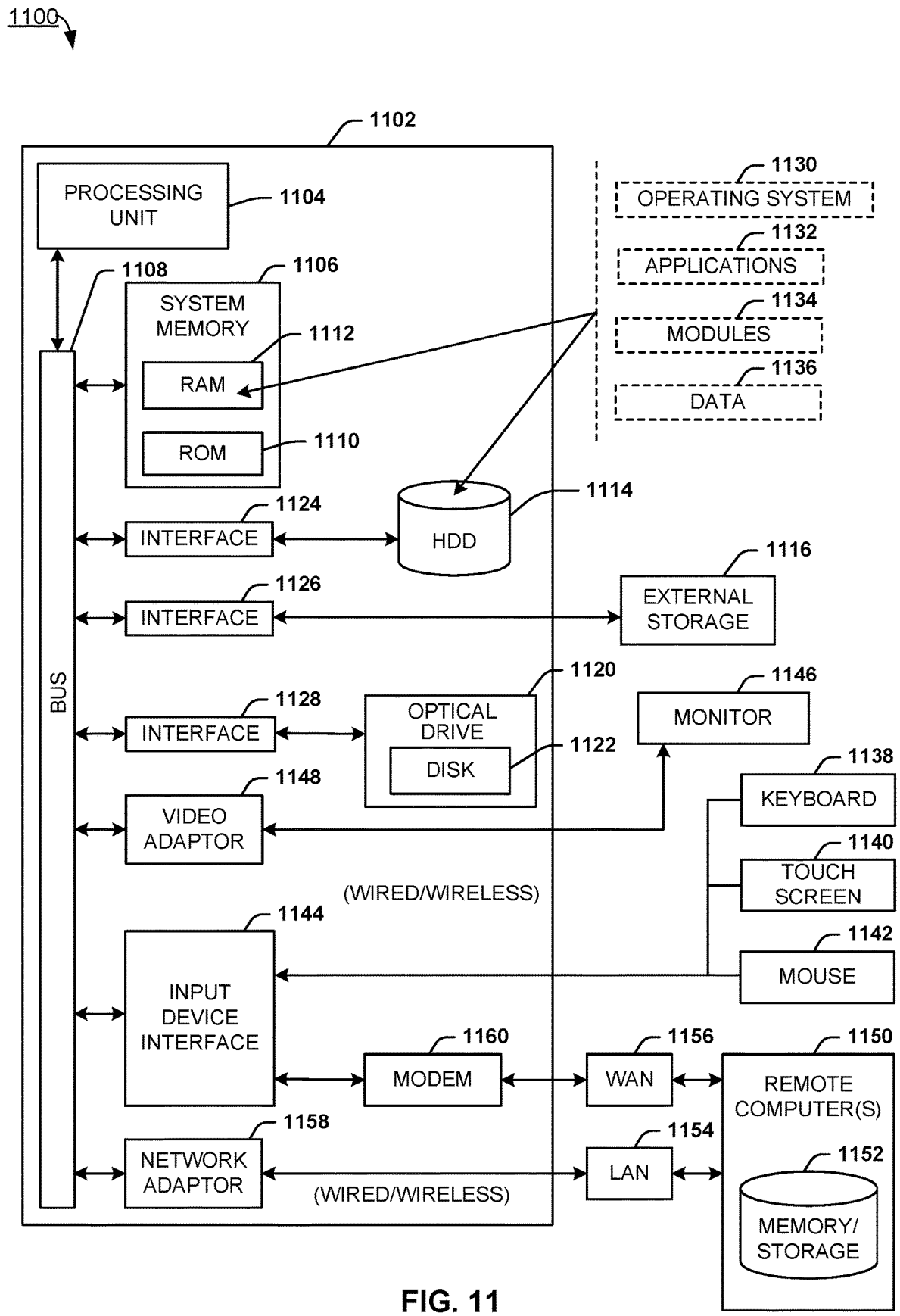
FIG. 11 illustrates an example block diagram of a computer operable to execute certain embodiments of this disclosure.

Each of client computer 102, computing cluster 106a, and computing cluster 106b can be implemented with one or more instances of computer 1102 of FIG. 11.

Communications network 104 can comprise a computer communications network, such as the INTERNET, or an isolated private computer communications network.

Protocol driver 108 can comprise a driver that receives one or more network communications from client computer 102 via communications network 104. These network communications can specify a file system operation to perform according to a particular protocol, such as an object storage protocol, or a file storage protocol (like a server message block (SMB) protocol, or a network file system (NFS) protocol). Protocol driver 108 can translate these network communications into a protocol understood by file system 114, and send the translated communications to file system 114 to be processed, such as for data to be written to or read from computing cluster 106a.

In some examples, protocol driver 108 processes network communications in multiple protocols. In other examples, there can be multiple instances of protocol driver 108, which each process network communications according to one different protocol.

Data size based replication component 110 can comprise a computer process that handles RDO replication. Data size based replication component 110 can register with protocol driver 108 to receive notifications about data changes on file system 114. Where data size based replication component 110 determines that a threshold amount of data changes have been made that correspond to a replication policy, data size based replication component 110 can start a replication for that replication policy. In some examples, data size based replication component 110 starting a replication comprises data size based replication component 110 sending a message to time based replication component 112 to start a replication on behalf of data size based replication component 110.

Data size based replication component 110 can maintain a counter for each replication policy that tracks how much data (in bytes) has been changed since a prior replication for that policy. When time based replication component 112 successfully completes a replication, it can send a message to data size based replication component 110 indicative of that success, and in response, data size based replication component 110 can reset the counter that corresponds to the replication policy.

Time based replication component 112 can comprise a computer process that handles RPO replication. Time based replication component 112 can maintain a timer for each replication process it is responsible for. Where time based replication component 112 determines that a threshold amount of time has elapsed since a prior replication for a replication policy (or since time based replication component 112 began), time based replication component 112 can start a replication. Time based replication component 112 can also perform replications on behalf of data size based replication component 110 in response to receiving requests from data size based replication component 110. When time based replication component 112 completes a replication triggered by a RPO or a RDO, time based replication component 112 can send an indication of success to data size based replication component 110, which can reset its counter, so that the counter measures an amount of data changed (that corresponds to a particular replication policy) since the most recent replication for that replication policy. After completing a replication, time based replication component 112 can also reset a timer that it maintains that measures a time that has occurred since the most recent replication for a given replication policy.

In this manner, time based replication component 112 can coordinate the replications triggered by both RPOs and RDOs for a given replication policy.

In some examples, data size based replication component 110 can implement aspects of the process flows of FIGS. 3-10 to facilitate data size based replication.

File system 114 comprises a file system driver that processes requests for services of a file system, and a file system that organizes how data is stored on computer storage, such as a hard disk.

It can be appreciated that there can be other system architectures that implement the present techniques for data size and time based replication. For example, in some examples, a RDO component can coordinate replications on behalf of a RPO component. In other examples, each of a RDO component and a RPO component can perform their own replications and communicate about replications performed with the other component. In other examples, a single component can perform both RDO-related and RPO-related functions.

Figure 2:
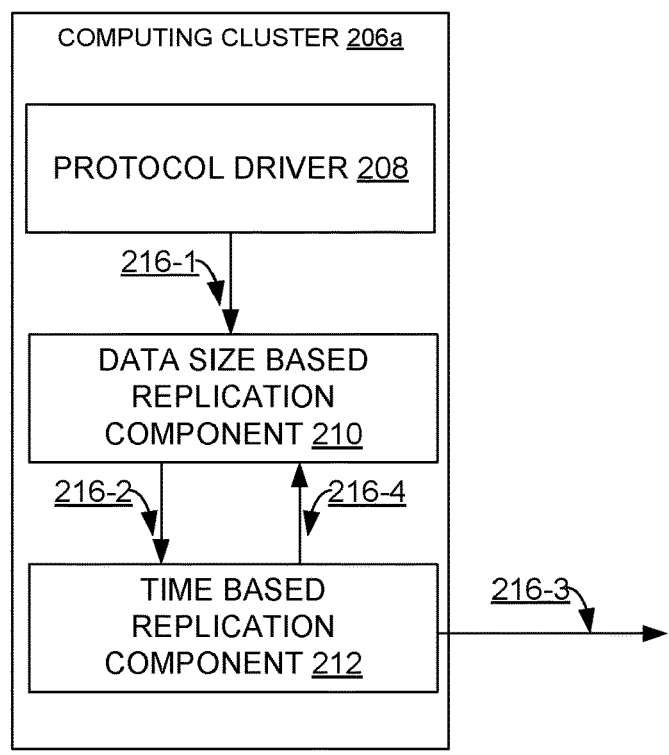
FIG. 2 illustrates another example system architecture that can facilitate data size and time based replication, where a time based replication coordinate performs replications, in accordance with certain embodiments of this disclosure.

FIG. 2 illustrates another example system architecture 200 that can facilitate data size and time based replication, where a time based replication coordinate performs replications, in accordance with certain embodiments of this disclosure. As depicted, system architecture 200 comprises computing cluster 206a, which itself comprises protocol driver 208, data size based replication component 210, and time based replication component 212. In some examples, computing cluster 206a can be similar to computing cluster 106a of FIG. 1, protocol driver 208 can be similar to protocol driver 108, data size based replication component 210 can be similar to data size based replication component 110, and time based replication component 212 can be similar to time based replication component 112.

In system architecture 200, protocol driver 208 receives a request to modify data (such as a request originated by client computer 102 of FIG. 1 that requests to modify data that is stored in file system 114). In response, protocol driver 208 sends a notification 216-1 of this data change to data size based replication component 210. Data size based replication component 210 can determine that the data change corresponds to a replication policy, and that enough data has been changed that corresponds to that replication policy since a most recent replication that this new data change triggers a RDO replication.

In response, data size based replication component 210 can send communication 216-2 to time based replication component 212, where communication 216-2 requests that a replication be performed for an identified replication policy. Time based replication component 212 can perform the replication by sending communication 216-3, and this replication can be, for example, a replication of data to computing cluster 106b of FIG. 1.

After determining that the replication has completed successfully, time based replication component 212 can reset its timer associated with the corresponding replication policy, and send communication 216-4 to data size based replication component 210, where communication 216-4 indicates that the replication was successfully completed. In response, data size based replication component 210 can reset a counter associated with the corresponding replication policy.

Then, data size based replication component 210 and time based replication component 212 can monitor for RDO and RPO triggers, respectively, that will cause a subsequent replication to be performed.

In some examples, each of notification 216-1, communication 216-2, and communication 216-4 can be implemented with one or more input/output (I/O) request packets, and communication 216-3 can be implemented with a communication according to a transmission control protocol/internet protocol (TCP/IP) communications protocol.

Figure 3:
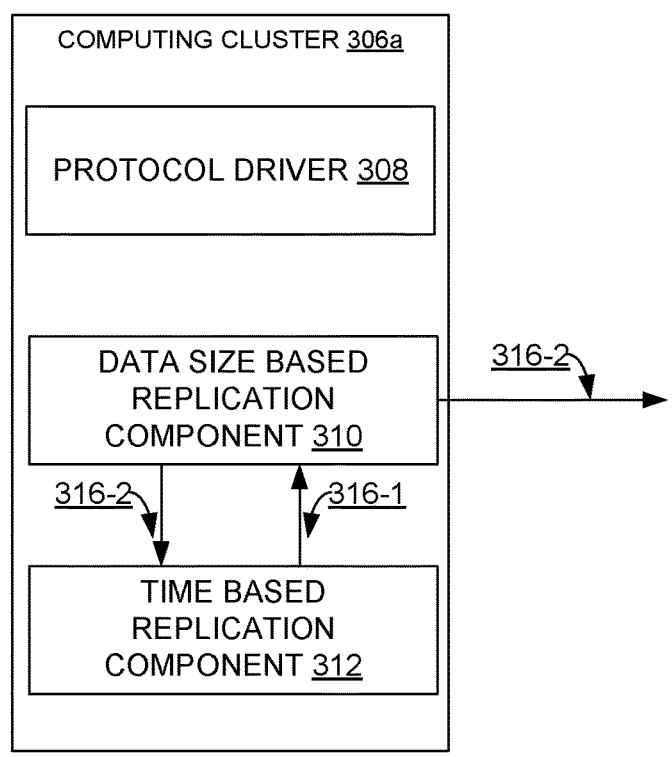
FIG. 3 illustrates another example system architecture that can facilitate data size and time based replication, where a data size based replication coordinate performs replications, in accordance with certain embodiments of this disclosure.

FIG. 3 illustrates another example system architecture 300 that can facilitate data size and time based replication, where a data size based replication coordinate performs replications, in accordance with certain embodiments of this disclosure. As depicted, system architecture 300 comprises computing cluster 306a, which itself comprises protocol driver 308, data size based replication component 310, and time based replication component 312. In some examples, computing cluster 306a can be similar to computing cluster 106a of FIG. 1, protocol driver 308 can be similar to protocol driver 108, data size based replication component 310 can be similar to data size based replication component 110, and time based replication component 312 can be similar to time based replication component 112.

In system architecture 300, time based replication component 312 can determine that a timer has elapsed for a replication policy since a replication was last performed for that replication policy. In response, time based replication component 312 can send communication 316-1 to data size based replication component 310 to request that data size based replication component 310 perform a replication.

In response, data size based replication component 310 can send communication 316-2 to perform the replication. After the replication successfully completes, data size based replication component 310 can reset a counter that it associates with the corresponding replication policy, and send communication 316-3 to time based replication component 312, which indicates that the replication successfully completed. In response, time based replication component 312 can reset a timer that it associates with the corresponding replication policy.

In some examples, communication 316-1 and communication 316-3 can be implemented in a similar manner as communication 216-2 and communication 216-4 of FIG. 2, respectively. In some examples, communication 316-2 can be implemented in a similar manner as communication 216-3 of FIG. 2.

Figure 4:
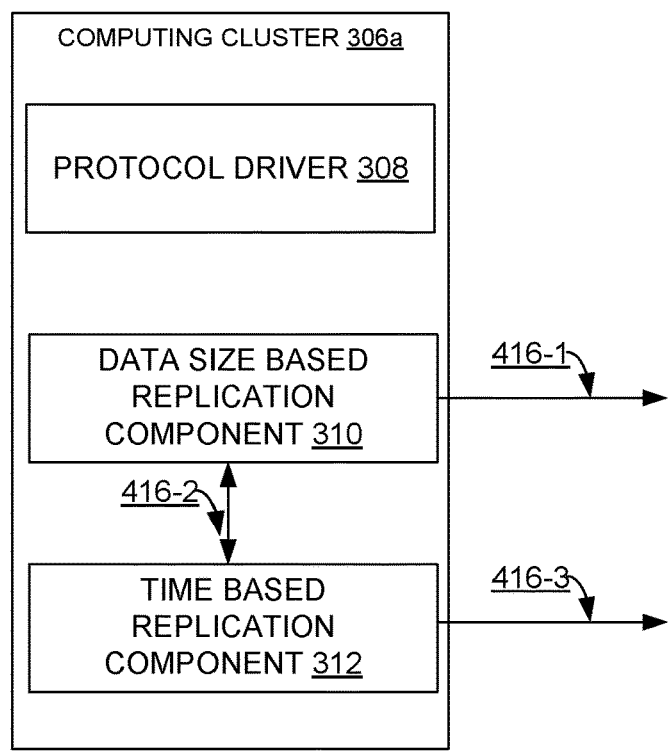
FIG. 4 illustrates another example system architecture that can facilitate data size and time based replication, where each of a data size based replication component and a time based replication coordinate performs replications, in accordance with certain embodiments of this disclosure.

FIG. 4 illustrates another example system architecture 400 that can facilitate data size and time based replication, where each of a data size based replication component and a time based replication coordinate performs replications, in accordance with certain embodiments of this disclosure.

As depicted, system architecture 400 comprises computing cluster 406a, which itself comprises protocol driver 408, data size based replication component 410, and time based replication component 412. In some examples, computing cluster 406a can be similar to computing cluster 106a of FIG. 1, protocol driver 408 can be similar to protocol driver 108, data size based replication component 410 can be similar to data size based replication component 110, and time based replication component 412 can be similar to time based replication component 112.

When data size based replication component 410 determines to perform a replication, data size based replication component 410 can perform its own replication, via communication 416-1. When the replication completes successfully, data size based replication component 410 can reset the counter it maintains for the corresponding replication policy, and send communication 416-2 to time based replication component 412, indicating that a replication has completed successfully. In response, time based replication component 412 can reset the timer it maintains for the corresponding replication policy.

In some examples, data size based replication component 410 can communicate with time based replication component 412 (via communication 416-2) when data size based replication component 410 determines to perform a replication so that time based replication component 412 does not start a replication for the same replication policy while the replication by data size based replication component 410 is underway.

Similarly, when time based replication component 412 determines to perform a replication, time based replication component 412 can perform its own replication, via communication 416-3. When the replication completes successfully, time based replication component 412 can reset the timer it maintains for the corresponding replication policy, and send communication 416-2 to data size based replication component 410, indicating that a replication has completed successfully. In response, data size based replication component 410 can reset the counter it maintains for the corresponding replication policy.

In some examples, time based replication component 412 can communicate with data size based replication component 410 (via communication 416-2) when time based replication component 412 determines to perform a replication so that data size based replication component 410 does not start a replication for the same replication policy while the replication by time based replication component 412 is underway.

In some examples, communication 416-1 and communication 416-3 can be implemented in a similar manner as communication 216-3 of FIG. 2. In some examples, communication 416-2 can be implemented in a similar manner as communication 216-2 and communication 216-4 of FIG. 2.

Example Process Flows

Figure 5:
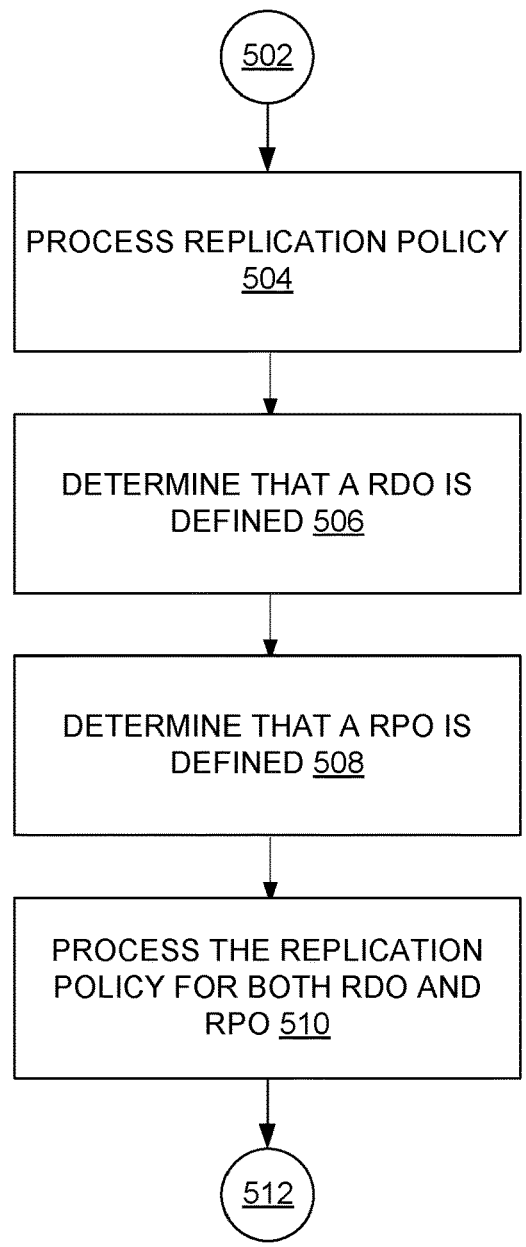
FIG. 5 illustrates an example process flow for data size and time based replication, where both a replication data objective (RDO) and a RPO are specified, in accordance with certain embodiments of this disclosure.

FIG. 5 illustrates an example process flow 500 for data size and time based replication, where both a RDO and a RPO are specified, in accordance with certain embodiments of this disclosure. In some examples, aspects of process flow 500 can be implemented by computing cluster 106a of FIG. 1, or computing environment 1100 of FIG. 11.

It can be appreciated that the operating procedures of process flow 500 are example operating procedures, and that there can be embodiments that implement more or fewer operating procedures than are depicted, or that implement the depicted operating procedures in a different order than as depicted. In some examples, process flow 500 can be implemented in conjunction with aspects of one or more of process flow 600 of FIG. 6, process flow 700 of FIG. 7, process flow 800 of FIG. 8, process flow 900 of FIG. 9, and process flow 1000 of FIG. 10.

Process flow 500 begins with 502 and moves to operation 504. Operation 504 depicts parsing a replication policy. In some examples, parsing the replication policy can comprise each of data size based replication component 110 of FIG. 1 and time based replication component 112 loading a replication policy that is stored in a known location of file system 114, and analyzing it to determine how to implement the replication policy. After operation 504, process flow 500 moves to operation 506.

Operation 506 depicts determining that a RDO is defined. In some examples, a replication policy can have a known location where a RDO, if any, is defined. In such examples, determining that the RDO is defined can comprise data size based replication component 110 of FIG. 1 determining that the RDO is defined at the known location of the replication policy of operation 504. After operation 506, process flow 500 moves to operation 508.

Operation 508 depicts determining that a RPO is defined. In some examples, operation 508 can be implemented in a similar manner as operation 506, but for a RPO instead of a RDO. After operation 508, process flow 500 moves to operation 510.

Operation 510 depicts processing the replication policy for both RDO and RPO. This can comprise both data size based replication component 110 of FIG. 1 maintaining a counter to determine when a RDO for the replication policy is triggered and a replication should start, and time based replication component 112 of FIG. 1 maintaining a timer to determine when a RPO for the replication policy is triggered and a replication should start. After operation 510, process flow 500 moves to operation 512, where process flow 500 ends.

Figure 6:
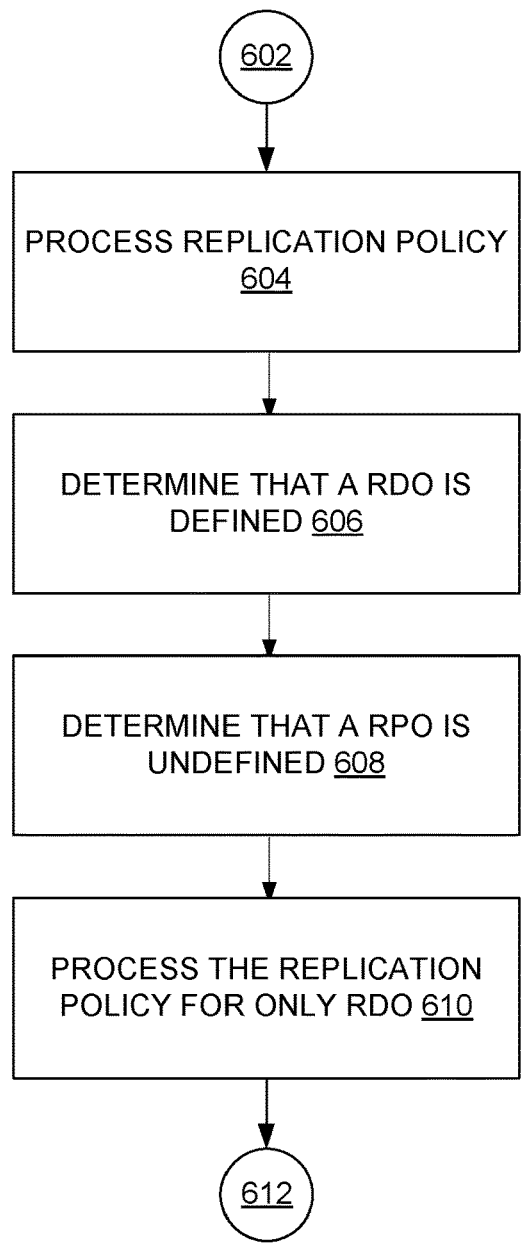
FIG. 6 illustrates an example process flow for data size and time based replication, where an RDO is specified and RPO is not specified, in accordance with certain embodiments of this disclosure.

FIG. 6 illustrates an example process flow 600 for data size and time based replication, where an RDO is specified and RPO is not specified, in accordance with certain embodiments of this disclosure. In some examples, aspects of process flow 600 can be implemented by computing cluster 106a of FIG. 1, or computing environment 1100 of FIG. 11.

It can be appreciated that the operating procedures of process flow 600 are example operating procedures, and that there can be embodiments that implement more or fewer operating procedures than are depicted, or that implement the depicted operating procedures in a different order than as depicted. In some examples, process flow 600 can be implemented in conjunction with aspects of one or more of process flow 500 of FIG. 5, process flow 700 of FIG. 7, process flow 800 of FIG. 8, process flow 900 of FIG. 9, and process flow 1000 of FIG. 10.

Process flow 600 begins with 602 and moves to operation 604. Operation 604 depicts parsing a replication policy. In some examples, operation 604 can be implemented in a similar manner as operation 504 of FIG. 5. After operation 604, process flow 600 moves to operation 606.

Operation 606 depicts determining that a RDO is defined. In some examples, operation 606 is implemented in a similar manner as operation 506 of FIG. 5. After operation 606, process flow 600 moves to operation 608.

Operation 608 depicts determining that a RPO is undefined. In some examples, this can comprise time based replication component 112 of FIG. 1 determining that a RPO is not defined at a known location of the replication policy of operation 604. After operation 608, process flow 600 moves to operation 610.

Operation 610 depicts processing the replication policy for only RDO. In some examples, this can comprise data size based replication component 110 of FIG. 1 maintaining a counter for the replication policy, and starting a replication when the RDO is met (such as by sending a communication to time based replication component 112 of FIG. 1 to perform a replication for the replication policy). Then, since a RPO is undefined for the replication policy, it can be that time based replication component 112 of FIG. 1 does not maintain a timer for the replication policy, and does not start a replication for the replication policy, since no RPO is defined that can be triggered. After operation 610, process flow 600 moves to operation 612, where process flow 600 ends.

Figure 7:
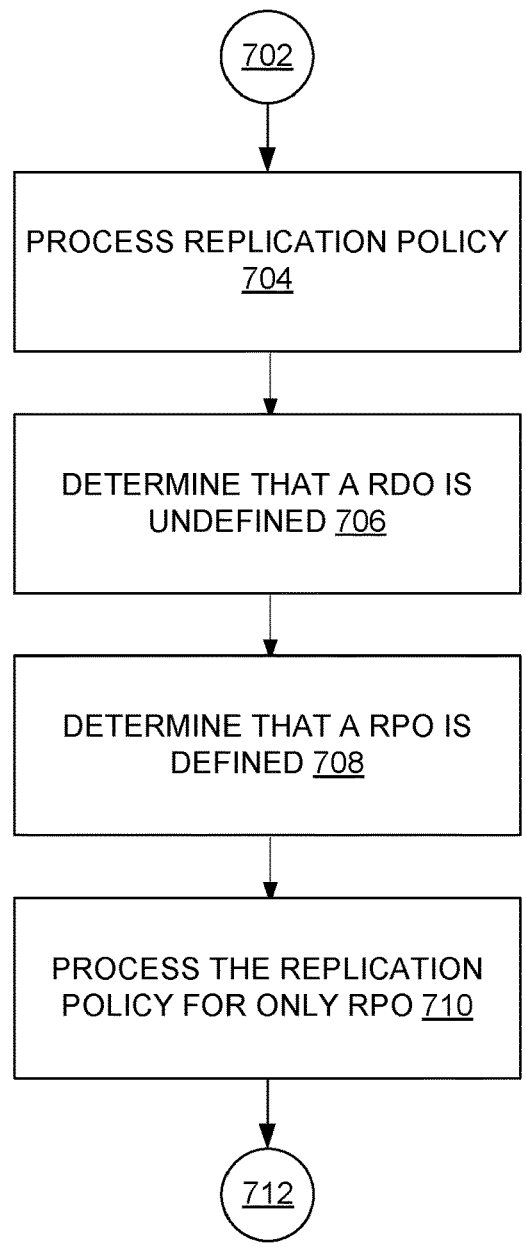
FIG. 7 illustrates an example process flow for data size and time based replication, where a RDO is not specified and a RPO is specified, in accordance with certain embodiments of this disclosure.

FIG. 7 illustrates an example process flow 700 for data size and time based replication, where a RDO is not specified and a RPO is specified, in accordance with certain embodiments of this disclosure. In some examples, aspects of process flow 700 can be implemented by computing cluster 106a of FIG. 1, or computing environment 1100 of FIG. 11.

It can be appreciated that the operating procedures of process flow 700 are example operating procedures, and that there can be embodiments that implement more or fewer operating procedures than are depicted, or that implement the depicted operating procedures in a different order than as depicted. In some examples, process flow 700 can be implemented in conjunction with aspects of one or more of process flow 500 of FIG. 5, process flow 600 of FIG. 6, process flow 800 of FIG. 8, process flow 900 of FIG. 9, and process flow 1000 of FIG. 10.

Process flow 700 begins with 702 and moves to operation 704. Operation 704 depicts parsing a replication policy. In some examples, operation 704 can be implemented in a similar manner as operation 504 of FIG. 5. After operation 704, process flow 700 moves to operation 706.

Operation 706 depicts determining that a RDO is undefined. In some examples, operation 706 can be implemented in a similar manner as operation 608 of FIG. 6, but with a RDO rather than a RPO. After operation 706, process flow 700 moves to operation 708.

Operation 708 depicts determining that a RPO is defined. In some examples, operation 708 can be implemented in a similar manner as operation 508 of FIG. 5. After operation 708, process flow 700 moves to operation 710.

Operation 710 depicts processing the replication policy for only RDO. In some examples, this can comprise time based replication component 112 of FIG. 1 maintaining a timer for the replication policy, and starting a replication when the RPO is met. Then, since a RDO is undefined for the replication policy, it can be that data size based replication component 110 of FIG. 1 does not maintain a counter for the replication policy, and does not start a replication for the replication policy, since no RDO is defined that can be triggered. After operation 710, process flow 700 moves to operation 712, where process flow 700 ends.

Figure 8:
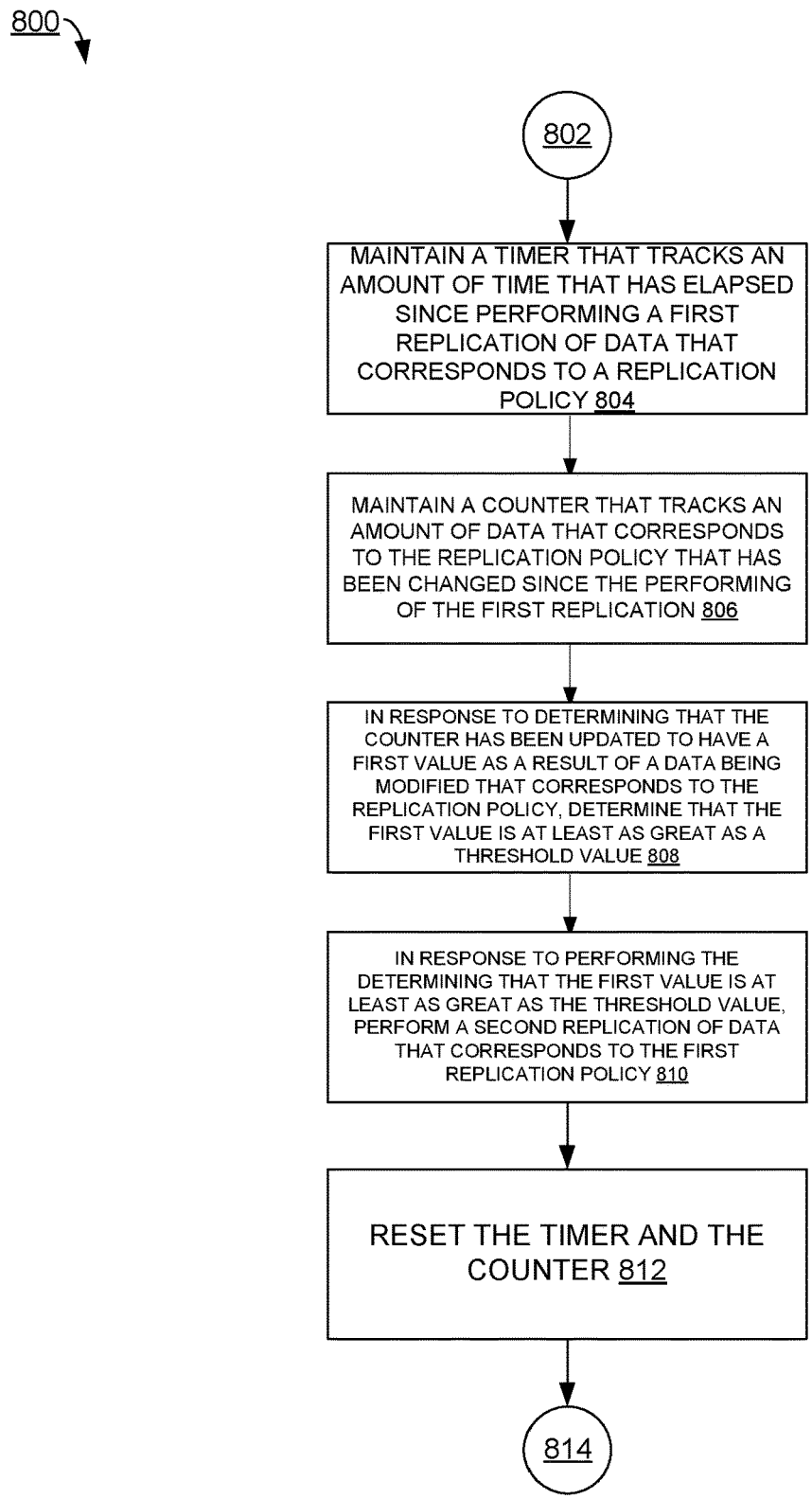
FIG. 8 illustrates an example process flow for data size and time based replication, in accordance with certain embodiments of this disclosure.

FIG. 8 illustrates an example process flow 800 for data size and time based replication, in accordance with certain embodiments of this disclosure. In some examples, aspects of process flow 800 can be implemented by computing cluster 106a of FIG. 1, or computing environment 1100 of FIG. 11.

It can be appreciated that the operating procedures of process flow 800 are example operating procedures, and that there can be embodiments that implement more or fewer operating procedures than are depicted, or that implement the depicted operating procedures in a different order than as depicted. In some examples, process flow 800 can be implemented in conjunction with aspects of one or more of process flow 500 of FIG. 5, process flow 600 of FIG. 6, process flow 700 of FIG. 7, process flow 900 of FIG. 9, and process flow 1000 of FIG. 10.

Process flow 800 begins with 802 and moves to operation 804. Operation 804 depicts maintaining a timer that tracks an amount of time that has elapsed since performing a first replication of data that corresponds to a replication policy.

After operation 804, process flow 800 moves to operation 806.

Operation 806 depicts maintaining a counter that tracks an amount of data that corresponds to the replication policy that has been changed since the performing of the first replication.

After operation 806, process flow 800 moves to operation 808.

Operation 808 depicts, in response to determining that the counter has been updated to have a first value as a result of a data being modified that corresponds to the replication policy, determining that the first value is at least as great as a threshold value.

After operation 808, process flow 800 moves to operation 810.

Operation 810 depicts, in response to performing the determining that the first value is at least as great as the threshold value, performing a second replication of data that corresponds to the first replication policy.

After operation 810, process flow 800 moves to operation 812.

Operation 812 depicts resetting the timer and the counter.

After operation 812, process flow 800 moves to 812, where process flow 800 ends.

Figure 9:
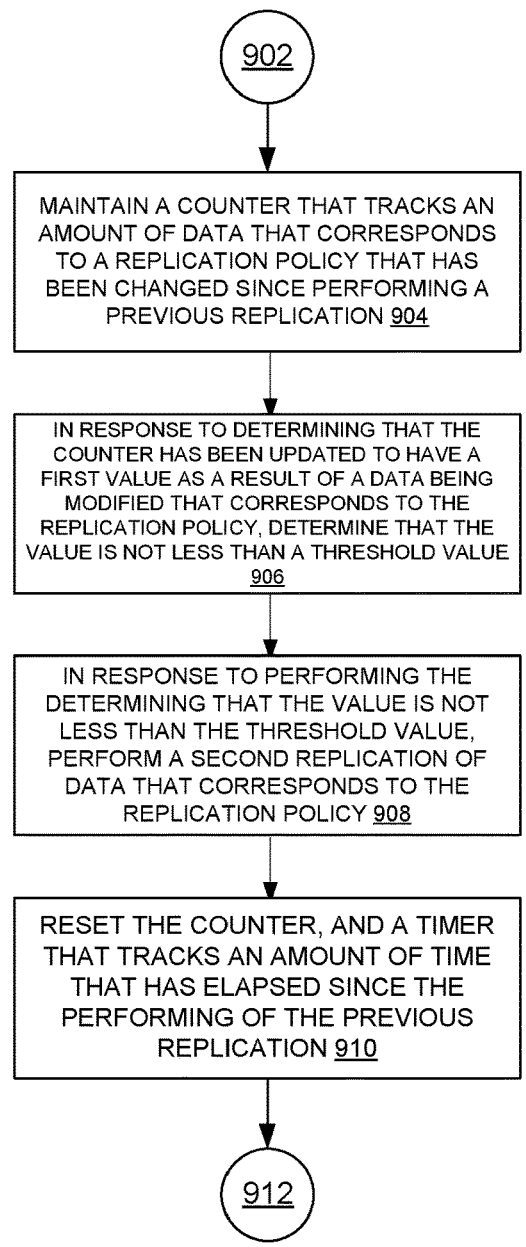
FIG. 9 illustrates an example process flow for data size and time based replication, in accordance with certain embodiments of this disclosure.

FIG. 9 illustrates an example process flow 900 for data size and time based replication, in accordance with certain embodiments of this disclosure. In some examples, aspects of process flow 900 can be implemented by computing cluster 106a of FIG. 1, or computing environment 1100 of FIG. 11.

It can be appreciated that the operating procedures of process flow 900 are example operating procedures, and that there can be embodiments that implement more or fewer operating procedures than are depicted, or that implement the depicted operating procedures in a different order than as depicted. In some examples, process flow 900 can be implemented in conjunction with aspects of one or more of process flow 500 of FIG. 5, process flow 600 of FIG. 6, process flow 700 of FIG. 7, process flow 800 of FIG. 8, and process flow 1000 of FIG. 10.

Process flow 900 begins with 902 and moves to operation 904. Operation 904 depicts maintaining a counter that tracks an amount of data that corresponds to a replication policy that has been changed since performing a previous replication.

After operation 904, process flow 900 moves to operation 906.

Operation 906 depicts in response to determining that the counter has been updated to have a first value as a result of a data being modified that corresponds to the replication policy, determining that the value is not less than a threshold value.

After operation 906, process flow 900 moves to operation 908.

Operation 908 depicts, in response to performing the determining that the value is not less than the threshold value, performing a second replication of data that corresponds to the replication policy.

After operation 908, process flow 900 moves to operation 910.

Operation 910 depicts resetting the counter, and a timer that tracks an amount of time that has elapsed since the performing of the previous replication.

After operation 910, process flow 900 moves to 912, where process flow 900 ends.

Figure 10:
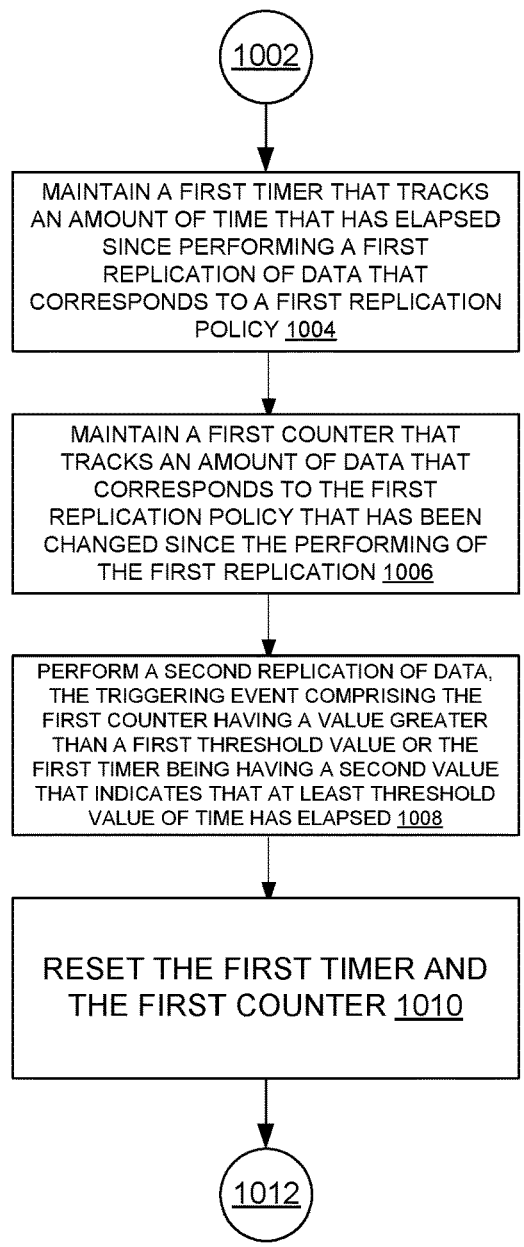
FIG. 10 illustrates an example process flow for data size and time based replication, in accordance with certain embodiments of this disclosure.

FIG. 10 illustrates an example process flow 1000 for data size and time based replication, in accordance with certain embodiments of this disclosure. In some examples, aspects of process flow 1000 can be implemented by computing cluster 106a of FIG. 1, or computing environment 1100 of FIG. 11.

It can be appreciated that the operating procedures of process flow 1000 are example operating procedures, and that there can be embodiments that implement more or fewer operating procedures than are depicted, or that implement the depicted operating procedures in a different order than as depicted. In some examples, process flow 1000 can be implemented in conjunction with aspects of one or more of process flow 500 of FIG. 5, process flow 600 of FIG. 6, process flow 700 of FIG. 7, process flow 800 of FIG. 8, and process flow 900 of FIG. 9.

Process flow 1000 begins with 1002 and moves to operation 1004. Operation 1004 depicts maintaining a first timer that tracks an amount of time that has elapsed since performing a first replication of data that corresponds to a first replication policy.

After operation 1004, process flow 1000 moves to operation 1006.

Operation 1006 depicts maintaining a first counter that tracks an amount of data that corresponds to the first replication policy that has been changed since the performing of the first replication.

After operation 1006, process flow 1000 moves to operation 1008.

Operation 1008 depicts, in response to determining that a triggering event has occurred, performing a second replication of data that corresponds to the first replication policy, the triggering event comprising at least one of the first counter being modified to have a first value that is greater than a first threshold value and the first timer being modified to have a second value that indicates that at least a second threshold value of time has elapsed since the performing of the first replication.

After operation 1010, process flow 1000 moves to operation 1010.

Operation 1010 depicts resetting the first timer and the first counter.

After operation 1010, process flow 1000 moves to 1012, where process flow 1000 ends.

Example Operating Environment

In order to provide additional context for various embodiments described herein, FIG. 11 and the following discussion are intended to provide a brief, general description of a suitable computing environment 1100 in which the various embodiments of the embodiment described herein can be implemented.

For example, aspects of computing environment 1100 can be used to implement aspects of client computer 102, computing cluster 106a, and/or computing cluster 106b of FIG. 1, computing cluster 206a of FIG. 2, computing cluster 306a of FIG, and/or computing cluster 406a of FIG. 4. In some examples, computing environment 1100 can implement aspects of the process flows of FIGS. 5-10 to facilitate data size and time based replication.

While the embodiments have been described above in the general context of computer-executable instructions that can run on one or more computers, those skilled in the art will recognize that the embodiments can be also implemented in combination with other program modules and/or as a combination of hardware and software.

Generally, program modules include routines, programs, components, data structures, etc., that perform particular tasks or implement particular abstract data types. Moreover, those skilled in the art will appreciate that the various methods can be practiced with other computer system configurations, including single-processor or multiprocessor computer systems, minicomputers, mainframe computers, Internet of Things (IoT) devices, distributed computing systems, as well as personal computers, hand-held computing devices, microprocessor-based or programmable consumer electronics, and the like, each of which can be operatively coupled to one or more associated devices.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media, machine-readable storage media, and/or communications media, which two terms are used herein differently from one another as follows. Computer-readable storage media or machine-readable storage media can be any available storage media that can be accessed by the computer and includes both volatile and nonvolatile media, removable and non-removable media. By way of example, and not limitation, computer-readable storage media or machine-readable storage media can be implemented in connection with any method or technology for storage of information such as computer-readable or machine-readable instructions, program modules, structured data or unstructured data.

Computer-readable storage media can include, but are not limited to, random access memory (RAM), read only memory (ROM), electrically erasable programmable read only memory (EEPROM), flash memory or other memory technology, compact disk read only memory (CD-ROM), digital versatile disk (DVD), Blu-ray disc (BD) or other optical disk storage, magnetic cassettes, magnetic tape, magnetic disk storage or other magnetic storage devices, solid state drives or other solid state storage devices, or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference again to FIG. 11, the example environment 1100 for implementing various embodiments of the aspects described herein includes a computer 1102, the computer 1102 including a processing unit 1104, a system memory 1106 and a system bus 1108. The system bus 1108 couples system components including, but not limited to, the system memory 1106 to the processing unit 1104. The processing unit 1104 can be any of various commercially available processors. Dual microprocessors and other multi-processor architectures can also be employed as the processing unit 1104.

The system bus 1108 can be any of several types of bus structure that can further interconnect to a memory bus (with or without a memory controller), a peripheral bus, and a local bus using any of a variety of commercially available bus architectures. The system memory 1106 includes ROM 1110 and RAM 1112. A basic input/output system (BIOS) can be stored in a non-volatile memory such as ROM, erasable programmable read only memory (EPROM), EEPROM, which BIOS contains the basic routines that help to transfer information between elements within the computer 1102, such as during startup. The RAM 1112 can also include a high-speed RAM such as static RAM for caching data.

The computer 1102 further includes an internal hard disk drive (HDD) 1114 (e.g., EIDE, SATA), one or more external storage devices 1116 (e.g., a magnetic floppy disk drive (FDD) 1116, a memory stick or flash drive reader, a memory card reader, etc.) and an optical disk drive 1120 (e.g., which can read or write from a CD-ROM disc, a DVD, a BD, etc.). While the internal HDD 1114 is illustrated as located within the computer 1102, the internal HDD 1114 can also be configured for external use in a suitable chassis (not shown). Additionally, while not shown in environment 1100, a solid state drive (SSD) could be used in addition to, or in place of, an HDD 1114. The HDD 1114, external storage device(s) 1116 and optical disk drive 1120 can be connected to the system bus 1108 by an HDD interface 1124, an external storage interface 1126 and an optical drive interface 1128, respectively. The interface 1124 for external drive implementations can include at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 1102, the drives and storage media accommodate the storage of any data in a suitable digital format. Although the description of computer-readable storage media above refers to respective types of storage devices, it should be appreciated by those skilled in the art that other types of storage media which are readable by a computer, whether presently existing or developed in the future, could also be used in the example operating environment, and further, that any such storage media can contain computer-executable instructions for performing the methods described herein.

A number of program modules can be stored in the drives and RAM 1112, including an operating system 1130, one or more application programs 1132, other program modules 1134 and program data 1136. All or portions of the operating system, applications, modules, and/or data can also be cached in the RAM 1112. The systems and methods described herein can be implemented utilizing various commercially available operating systems or combinations of operating systems.

Computer 1102 can optionally comprise emulation technologies. For example, a hypervisor (not shown) or other intermediary can emulate a hardware environment for operating system 1130, and the emulated hardware can optionally be different from the hardware illustrated in FIG. 11. In such an embodiment, operating system 1130 can comprise one virtual machine (VM) of multiple VMs hosted at computer 1102. Furthermore, operating system 1130 can provide runtime environments, such as the Java runtime environment or the .NET framework, for applications 1132. Runtime environments are consistent execution environments that allow applications 1132 to run on any operating system that includes the runtime environment. Similarly, operating system 1130 can support containers, and applications 1132 can be in the form of containers, which are lightweight, standalone, executable packages of software that include, e.g., code, runtime, system tools, system libraries and settings for an application.

Further, computer 1102 can be enable with a security module, such as a trusted processing module (TPM). For instance, with a TPM, boot components hash next in time boot components, and wait for a match of results to secured values, before loading a next boot component. This process can take place at any layer in the code execution stack of computer 1102, e.g., applied at the application execution level or at the operating system (OS) kernel level, thereby enabling security at any level of code execution.

A user can enter commands and information into the computer 1102 through one or more wired/wireless input devices, e.g., a keyboard 1138, a touch screen 1140, and a pointing device, such as a mouse 1142. Other input devices (not shown) can include a microphone, an infrared (IR) remote control, a radio frequency (RF) remote control, or other remote control, a joystick, a virtual reality controller and/or virtual reality headset, a game pad, a stylus pen, an image input device, e.g., camera(s), a gesture sensor input device, a vision movement sensor input device, an emotion or facial detection device, a biometric input device, e.g., fingerprint or iris scanner, or the like. These and other input devices are often connected to the processing unit 1104 through an input device interface 1144 that can be coupled to the system bus 1108, but can be connected by other interfaces, such as a parallel port, an IEEE 1394 serial port, a game port, a USB port, an IR interface, a BLUETOOTH® interface, etc.

A monitor 1146 or other type of display device can be also connected to the system bus 1108 via an interface, such as a video adapter 1148. In addition to the monitor 1146, a computer typically includes other peripheral output devices (not shown), such as speakers, printers, etc.

The computer 1102 can operate in a networked environment using logical connections via wired and/or wireless communications to one or more remote computers, such as a remote computer(s) 1150. The remote computer(s) 1150 can be a workstation, a server computer, a router, a personal computer, portable computer, microprocessor-based entertainment appliance, a peer device or other common network node, and typically includes many or all of the elements described relative to the computer 1102, although, for purposes of brevity, only a memory/storage device 1152 is illustrated. The logical connections depicted include wired/wireless connectivity to a local area network (LAN) 1154 and/or larger networks, e.g., a wide area network (WAN) 1156. Such LAN and WAN networking environments are commonplace in offices and companies, and facilitate enterprise-wide computer networks, such as intranets, all of which can connect to a global communications network, e.g., the Internet.

When used in a LAN networking environment, the computer 1102 can be connected to the local network 1154 through a wired and/or wireless communication network interface or adapter 1158. The adapter 1158 can facilitate wired or wireless communication to the LAN 1154, which can also include a wireless access point (AP) disposed thereon for communicating with the adapter 1158 in a wireless mode.

When used in a WAN networking environment, the computer 1102 can include a modem 1160 or can be connected to a communications server on the WAN 1156 via other means for establishing communications over the WAN 1156, such as by way of the Internet. The modem 1160, which can be internal or external and a wired or wireless device, can be connected to the system bus 1108 via the input device interface 1144. In a networked environment, program modules depicted relative to the computer 1102 or portions thereof, can be stored in the remote memory/storage device 1152. It will be appreciated that the network connections shown are example and other means of establishing a communications link between the computers can be used.

When used in either a LAN or WAN networking environment, the computer 1102 can access cloud storage systems or other network-based storage systems in addition to, or in place of, external storage devices 1116 as described above. Generally, a connection between the computer 1102 and a cloud storage system can be established over a LAN 1154 or WAN 1156 e.g., by the adapter 1158 or modem 1160, respectively. Upon connecting the computer 1102 to an associated cloud storage system, the external storage interface 1126 can, with the aid of the adapter 1158 and/or modem 1160, manage storage provided by the cloud storage system as it would other types of external storage. For instance, the external storage interface 1126 can be configured to provide access to cloud storage sources as if those sources were physically connected to the computer 1102.

The computer 1102 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, store shelf, etc.), and telephone. This can include Wireless Fidelity (Wi-Fi) and BLUETOOTH® wireless technologies. Thus, the communication can be a predefined structure as with a conventional network or simply an ad hoc communication between at least two devices.

CONCLUSION

As it employed in the subject specification, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory in a single machine or multiple machines. Additionally, a processor can refer to an integrated circuit, a state machine, an application specific integrated circuit (ASIC), a digital signal processor (DSP), a programmable gate array (PGA) including a field programmable gate array (FPGA), a programmable logic controller (PLC), a complex programmable logic device (CPLD), a discrete gate or transistor logic, discrete hardware components, or any combination thereof designed to perform the functions described herein. Processors can exploit nano-scale architectures such as, but not limited to, molecular and quantum-dot based transistors, switches and gates, in order to optimize space usage or enhance performance of user equipment. A processor may also be implemented as a combination of computing processing units. One or more processors can be utilized in supporting a virtualized computing environment. The virtualized computing environment may support one or more virtual machines representing computers, servers, or other computing devices. In such virtualized virtual machines, components such as processors and storage devices may be virtualized or logically represented. In an aspect, when a processor executes instructions to perform "operations", this could include the processor performing the operations directly and/or facilitating, directing, or cooperating with another device or component to perform the operations.

In the subject specification, terms such as "data store," data storage," "database," "cache," and substantially any other information storage component relevant to operation and functionality of a component, refer to "memory components," or entities embodied in a "memory" or components comprising the memory. It will be appreciated that the memory components, or computer-readable storage media, described herein can be either volatile memory or nonvolatile memory, or can include both volatile and nonvolatile memory. By way of illustration, and not limitation, nonvolatile memory can include ROM, programmable ROM (PROM), EPROM, EEPROM, or flash memory. Volatile memory can include RAM, which acts as external cache memory. By way of illustration and not limitation, RAM can be available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to comprise, without being limited to comprising, these and any other suitable types of memory.

The illustrated aspects of the disclosure can be practiced in distributed computing environments where certain tasks are performed by remote processing devices that are linked through a communications network. In a distributed computing environment, program modules can be located in both local and remote memory storage devices.

The systems and processes described above can be embodied within hardware, such as a single integrated circuit (IC) chip, multiple ICs, an ASIC, or the like. Further, the order in which some or all of the process blocks appear in each process should not be deemed limiting. Rather, it should be understood that some of the process blocks can be executed in a variety of orders that are not all of which may be explicitly illustrated herein.

As used in this application, the terms "component," "module," "system," "interface," "cluster," "server," "node," or the like are generally intended to refer to a computer-related entity, either hardware, a combination of hardware and software, software, or software in execution or an entity related to an operational machine with one or more specific functionalities. For example, a component can be, but is not limited to being, a process running on a processor, a processor, an object, an executable, a thread of execution, computer-executable instruction(s), a program, and/or a computer. By way of illustration, both an application running on a controller and the controller can be a component. One or more components may reside within a process and/or thread of execution and a component may be localized on one computer and/or distributed between two or more computers. As another example, an interface can include input/output (I/O) components as well as associated processor, application, and/or API components.

Further, the various embodiments can be implemented as a method, apparatus, or article of manufacture using standard programming and/or engineering techniques to produce software, firmware, hardware, or any combination thereof to control a computer to implement one or more aspects of the disclosed subject matter. An article of manufacture can encompass a computer program accessible from any computer-readable device or computer-readable storage/communications media. For example, computer readable storage media can include but are not limited to magnetic storage devices (e.g., hard disk, floppy disk, magnetic strips . . . ), optical discs (e.g., CD, DVD . . . ), smart cards, and flash memory devices (e.g., card, stick, key drive . . . ). Of course, those skilled in the art will recognize many modifications can be made to this configuration without departing from the scope or spirit of the various embodiments.

In addition, the word "example" or "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion. As used in this application, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

What has been described above includes examples of the present specification. It is, of course, not possible to describe every conceivable combination of components or methods for purposes of describing the present specification, but one of ordinary skill in the art may recognize that many further combinations and permutations of the present specification are possible. Accordingly, the present specification is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A system, comprising:
   a processor; and
   a memory that stores executable instructions that, when executed by the processor, facilitate performance of operations, comprising:
   maintaining, by a first process, a timer that tracks an amount of time that has elapsed since performing a first replication of data that corresponds to a replication policy;
   maintaining, by a second process, a counter that tracks an amount of data that corresponds to the replication policy that has been changed since the performing of the first replication;
   in response to the second process determining that the counter has been updated to have a first value as a result of a data being modified that corresponds to the replication policy, determining, by the second process, that the first value is at least as great as a threshold value;
   in response to performing the determining that the first value is at least as great as the threshold value, requesting, by the second process and of the first process, that the first process perform a second replication of data that corresponds to the replication policy, wherein the first process is configured to perform a third replication of data based on the first process determining, internal to the first process, that the timer indicates the amount of time since the first replication satisfies the replication policy, wherein the first process comprises a recovery point objective daemon that is configured to perform replications independently of the second process and on behalf of the second process, and wherein the second process comprises a recovery data objective daemon that lacks a configuration to perform replications independently of making requests to the first process;
   performing, by the first process, the second replication; and
   resetting the timer and the counter.

2. The system of claim 1, wherein the operations further comprise:
   after the performing of the second replication, performing a third replication in response to determining that the timer has been updated to have a second value that is at least as great as a second threshold value.

3. The system of claim 2, wherein the operations further comprise
   resetting the timer and the counter in response to the performing of the third replication.

4. The system of claim 1, wherein the first process performs the resetting of the timer.

5. The system of claim 1, wherein the second process performs the resetting of the counter.

6. The system of claim 5, wherein the second process performs the resetting of the counter in response to receiving an indication from the first process that the performing of the second replication is complete.

7. A method, comprising:
   maintaining, by a second process of a system comprising a processor, a counter that tracks an amount of data that corresponds to a replication policy that has been changed since performing a previous replication;
   in response to determining that the counter has been updated to have a first value as a result of a data being modified that corresponds to the replication policy, determining, by the second process, that the first value is not less than a threshold value;
   in response to performing the determining that the first value is not less than the threshold value, requesting, by the second process and of a first process of the system, that the first process perform a second replication of data that corresponds to the replication policy, wherein the first process is configured to perform a third replication of data based on the first process determining that a timer indicates an amount of time since the first replication satisfies the replication policy, wherein the first process comprises a recovery point objective daemon that is configured to perform replications independently of the second process and on behalf of the second process, and wherein the second process comprises a recovery data objective daemon that lacks a configuration to perform replications independently of making requests to the first process; and
   resetting, by the system, the counter, and the timer that tracks the amount of time that has elapsed since the performing of the previous replication.

8. The method of claim 7, wherein performing the resetting of the timer and the counter is performed after successfully performing the second replication.

9. The method of claim 7, further comprising:
in response to determining that a third replication has not successfully completed, determining not to reset the counter and the timer.

10. The method of claim 7, wherein the counter is a first counter, wherein the timer is a first timer, wherein the replication policy is a first replication policy, and further comprising:
maintaining, by the system, a second counter and a second timer that are associated with a second replication policy.

11. The method of claim 10, further comprising:
determining, by the system, not to reset the second counter and the second timer in response to the performing of the second replication of data that corresponds to the first replication policy.

12. The method of claim 7, further comprising:
after the performing of the second replication, performing a third replication in response to determining that the timer has been updated to have a second value that is not less than a second threshold value.

13. The method of claim 7, wherein the second process performs the resetting of the counter.

14. The method of claim 13, wherein the second process performs the resetting of the counter in response to receiving an indication from the first process that the performing of the second replication is complete.

15. A non-transitory computer-readable medium comprising instructions that, in response to execution, cause a system comprising a processor to perform operations, comprising:
maintaining, by a first process, a first timer that tracks an amount of time that has elapsed since performing a first replication of data that corresponds to a first replication policy;
maintaining, by a second process, a first counter that tracks an amount of data that corresponds to the first replication policy that has been changed since the performing of the first replication;
in response to determining that a triggering event has occurred, performing, by the first process, a second replication of data that corresponds to the first replication policy, the triggering event comprising at least one of the second process determining that the first counter is modified to have a first value that is greater than a first threshold value and the second process requesting that the first process perform the second replication, and the first process determining, internal to the first process, the first timer being modified to have a second value that indicates that at least a second threshold value of time has elapsed since the performing of the first replication, wherein the first process comprises a recovery point objective daemon that is configured to perform replications independently of the second process and on behalf of the second process, and wherein the second process comprises a recovery data objective daemon that lacks a configuration to perform replications independently of making requests to the first process; and
resetting the first timer and the first counter.

16. The non-transitory computer-readable medium of claim 15, wherein the operations further comprise:
in response to determining that a second replication policy defines a time threshold for replication and does not define a data modification threshold for replication, performing a third replication associated with the second replication policy upon reaching the time threshold for replication.

17. The non-transitory computer-readable medium of claim 15, wherein the operations further comprise:
in response to determining that a second replication policy defines a data modification threshold for replication and does not define a time threshold for replication, performing a third replication associated with the second replication policy upon reaching the data modification threshold for replication.

18. The non-transitory computer-readable medium of claim 17, wherein the data associated with defining the first replication policy is stored in a computer storage location, and wherein the second process obtains at least some of the data associated with defining the first replication policy from the computer storage location and independently of the first process.

19. The non-transitory computer-readable medium of claim 18, wherein the second process performs the second replication of data based on an impact policy specified by the first replication policy.

20. The non-transitory computer-readable medium of claim 15, wherein the second process performs the resetting of the first counter in response to receiving an indication from the first process that the performing of the second replication is complete.

* * * * *